(12) United States Patent
Naruse et al.

(10) Patent No.: US 12,162,299 B2
(45) Date of Patent: *Dec. 10, 2024

(54) INKJET INK

(71) Applicant: NORITAKE CO., LIMITED, Nagoya (JP)

(72) Inventors: Asako Naruse, Nagoya (JP); Tomoshi Kumazawa, Nagoya (JP); Yuuki Arakawa, Nagoya (JP)

(73) Assignee: NORITAKE CO., LIMITED (JP)

( * ) Notice: Subject to any disclaimer, the term of this patent is extended or adjusted under 35 U.S.C. 154(b) by 112 days.

This patent is subject to a terminal disclaimer.

(21) Appl. No.: 17/913,091

(22) PCT Filed: Mar. 19, 2021

(86) PCT No.: PCT/JP2021/011436
§ 371 (c)(1),
(2) Date: Sep. 20, 2022

(87) PCT Pub. No.: WO2021/193447
PCT Pub. Date: Sep. 30, 2021

(65) Prior Publication Data
US 2023/0159377 A1 May 25, 2023

(30) Foreign Application Priority Data
Mar. 25, 2020 (JP) ................. 2020-054527

(51) Int. Cl.
C09D 11/101 (2014.01)
B41M 5/00 (2006.01)
(Continued)

(52) U.S. Cl.
CPC .......... *B41M 5/007* (2013.01); *B41M 5/0011* (2013.01); *C03C 8/14* (2013.01);
(Continued)

(58) Field of Classification Search
CPC ................................................... C09D 11/101
See application file for complete search history.

(56) References Cited

U.S. PATENT DOCUMENTS

2007/0139476 A1\* 6/2007 Schwartz ............. C09D 11/101
522/71
2007/0159615 A1 7/2007 Horiuchi
(Continued)

FOREIGN PATENT DOCUMENTS

CN 105368140 A 3/2016
CN 105452004 A 3/2016
(Continued)

OTHER PUBLICATIONS

Naruse, Asako; International Preliminary Report on Patentability for PCT/JP2021/011436, filed Mar. 19, 2021, mailed Sep. 22, 2022, 11 pgs.
(Continued)

Primary Examiner — Shelby L Fidler
(74) Attorney, Agent, or Firm — Taylor English Duma LLP

(57) ABSTRACT

An inkjet ink for a glass substrate can enable formation of an aesthetic image with high concealability on the surface of the glass substrate. The inkjet ink disclosed here can include: an inorganic solid including an inorganic pigment that develops a color except for black and a glass frit; a monomer component having a photocuring property; and a photoinitiator. In the inkjet ink, a volume ratio of the inorganic solid in a case where an ink total volume is 100 volume % can be 35 volume % or less, a volume ratio of the inorganic pigment in the case where a total volume of the inorganic solid is 100 volume % can be 15 volume % or more and less than 90 volume %, and a volume ratio of the inorganic pigment to the photoinitiator can be 11 times or less.

8 Claims, 3 Drawing Sheets

(51) Int. Cl.
*C03C 8/14* (2006.01)
*C03C 8/16* (2006.01)
*C03C 8/20* (2006.01)

(52) U.S. Cl.
CPC ............. *C03C 8/16* (2013.01); *C03C 8/20* (2013.01); *C09D 11/101* (2013.01); *C03C 2207/00* (2013.01)

(56) References Cited

U.S. PATENT DOCUMENTS

| | | |
|---|---|---|
| 2009/0117276 A1 | 5/2009 | Ito |
| 2016/0167416 A1 | 6/2016 | Ikeda et al. |
| 2017/0107388 A1 | 4/2017 | Wang et al. |
| 2017/0240754 A1 | 8/2017 | Tsuchiya et al. |
| 2019/0031895 A1 | 1/2019 | Sato et al. |
| 2020/0199389 A1 | 6/2020 | Hayashi et al. |
| 2023/0167321 A1 | 6/2023 | Naruse et al. |

FOREIGN PATENT DOCUMENTS

| | | |
|---|---|---|
| CN | 105934484 A | 9/2016 |
| CN | 107001829 A | 8/2017 |
| CN | 108368367 A | 8/2018 |
| CN | 108603059 A | 9/2018 |
| CN | 109439068 A | 3/2019 |
| EP | 2965904 | 1/2016 |
| EP | 3101072 | 12/2016 |
| JP | 2001081363 | 3/2001 |
| JP | 2002501641 | 1/2002 |
| JP | 2003012972 | 1/2003 |
| JP | 2004099432 | 4/2004 |
| JP | 2009154419 | 7/2009 |
| JP | 2012177026 | 9/2012 |
| JP | 5135830 | 2/2013 |
| JP | 2014172271 | 9/2014 |
| JP | 2015160890 | 9/2015 |
| JP | 2016069390 | 5/2016 |
| JP | 2017075251 | 4/2017 |
| JP | 2017149811 | 8/2017 |
| JP | 2018188581 | 11/2018 |
| JP | 2020041116 | 3/2020 |
| WO | 9848374 | 10/1998 |
| WO | 2007020779 | 2/2007 |
| WO | 2007080779 | 7/2007 |
| WO | WO-2016008848 A1 * | 1/2016 ........... C03C 17/007 |
| WO | 2016096632 | 6/2016 |
| WO | 2017070236 | 4/2017 |
| WO | 2019044429 | 3/2019 |
| WO | WO-2019202889 A1 * | 10/2019 ............ G03F 7/004 |
| WO | 2021193448 | 9/2021 |

OTHER PUBLICATIONS

Naruse, Asako; International Search Report and Written Opinion for PCT/JP2021/011436, filed Mar. 19, 2021, mailed Jun. 8, 2021, 17 pgs.

Naruse, Asako; International Search Report and Written Opinion for PCT/JP2021/011437, filed Mar. 19, 2021, mailed Jun. 8, 2021, 17 pgs.

Naruse, Asako; International Preliminary Report on Patentability for PCT/JP2021/011437, filed Mar. 19, 2021, mailed Sep. 22, 2022, 11 pgs.

Noritake Co., Limited; Office Action for Chinese patent application No. 202180023855.4, mailed Aug. 30, 2023, 13 pgs.

Noritake Co., Limited; Office Action for Chinese patent application No. 202180023938.3, mailed May 25, 2023, 11 pgs.

Noritake Co., Limited; Office Action for Chinese patent application No. 202180023855.4, mailed Nov. 23, 2023, 26 pgs.

Noritake Co., Limited; Office Action for Chinese patent application No. 202180023855.4, mailed Apr. 15, 2023, 12 pgs.

Naruse, Asako; Non-Final Office Action for U.S. Appl. No. 17/913,087, filed Sep. 20, 2022, mailed Mar. 8, 2024, 35 pgs.

* cited by examiner

INKJET INK

TECHNICAL FIELD

The present disclosure relates to an inkjet ink. Specifically, the present disclosure relates to an inkjet ink for a glass substrate for use in drawing an image on a transparent glass substrate. This application claims the benefit of priority to Japanese Patent Application No. 2020-054527 filed on Mar. 25, 2020. The entire contents of this application are hereby incorporated herein by reference.

BACKGROUND ART

Inkjet printing has been employed to date as a printing method for drawing an intended image such as a pattern or characters on a printing target. Inkjet printing can draw an image precisely with a simple reasonable device, and thus, has been used in various fields. In recent years, the use of inkjet printing has been studied in drawing an image on an inorganic substrate such as a glass substrate, a ceramic substrate (e.g., a ceramic or a ceramic tile), or a metal substrate. Specifically, to draw an image such as a pattern or characters in the field of inorganic substrates, handwriting or plate printing has been conventionally employed. On the other hand, inkjet printing does not need a skilled artisan technique such as handwriting and, unlike plate printing, enables quick on-demand printing. Thus, inkjet printing has attracted attention from the viewpoint of productivity improvement.

It is, however, difficult to apply the inkjet printing technique employed in the fields of paper and cloth to the field of inorganic substrates without change. Inkjet printing in the field of inorganic substances has much room for improvement. For example, in a product using an inorganic substrate (inorganic product), calcination can be performed at 450° C. or more (e.g., 450° C. to 1200° C.) on an inorganic substance on which an image is drawn. In this calcination, if an inkjet ink for paper or cloth is used, a pigment might be discolored (or fade) during the calcination. In view of this, an inkjet ink for use in an inorganic substrate requiring calcination (inorganic substrate inkjet ink) needs to have a composition in which calcination is taken into consideration. Examples of the inorganic substrate inkjet ink include inks described in, for example, Patent Documents 1 to 3. Unlike paper and cloth, an inorganic substrate does not absorb ink. Thus, as the inkjet ink for inorganic substrates, a photocurable ink including a photocurable component (e.g., photocurable monomer) is generally used.

In inorganic substrates described above, a glass substrate, a ceramic substrate, and a metal substrate require different ink properties (e.g., fixing property). In view of this, in the field of recent inorganic substrate inkjet inks, it has been investigated that an ink composition is changed in further details depending on a printing target. For example, Patent Document 4 discloses an inkjet ink for a glass substrate as a printing target (glass substrate inkjet ink). The ink disclosed in Patent Document 4 is supposed to have high adhesion especially to a glass substrate because a cross-linking agent and a silicone resin have a siloxane bond.

CITATION LIST

Patent Documents

Patent Document 1: WO2007/20779
Patent Document 2: JP2017-75251A
Patent Document 3: JP2009-154419A
Patent Document 4: JP2016-069390A

SUMMARY OF INVENTION

Technical Problems

However, in the conventional technique described above, although adhesion to a glass substrate has been studied, aesthetic appearance of an image formed by using the ink has been insufficiently studied. Specifically, in the case of a transparent glass substrate, if an image drawn on the surface of the glass substrate has high permeability (low concealability), the opposite side of the image is visible through the substrate. Thus, aesthetic appearance might be significantly impaired for some type of the image.

It is therefore a main object of the present disclosure to provide a glass substrate inkjet ink enabling formation of an aesthetic image with high concealability on a surface of a glass substrate by inkjet printing. It is another object of the present disclosure to provide a method for producing a glass product using the glass substrate inkjet ink.

Solution to Problem

In view of the foregoing problems, to form an image with high concealability, the content of an inorganic pigment in an ink needs to be increased. The ink with an increased amount of the inorganic pigment, however, has other problems, and thus, cannot be easily used.

First, the ink with an increased amount of the inorganic pigment has a significantly increased viscosity and makes inkjet printing difficult. Consequently, a precise image cannot be drawn with this ink. Inventors of the present disclosure assumed that the viscosity of an inkjet ink is affected by the total amount of an inorganic solid including an inorganic pigment and a glass frit. Thus, the ink viscosity can be maintained at a low level by reducing the amount of the glass frit in accordance with an increase in the amount of the inorganic pigment to thereby reduce the total amount of the inorganic solid to a certain level or less. On the other hand, the glass frit is a component for fixing the inorganic pigment to the substrate surface. Therefore, when the content of the glass frit is excessively reduced, an image after calcination might fail to be fixed on the surface of the glass substrate. In view of these, the inventors of the present disclosure conceived that the "content ratio of the inorganic solid to the ink total amount" and the "content ratio of the inorganic pigment to the total amount of the inorganic pigment" are adjusted so that an ejection property in printing, concealability of an image after calcination, and a fixing property to the glass substrate are well harmonized at high levels. The ink viscosity is directly affected not by the "weight" but by the "volume" of the inorganic solid. In view of this, in the technique disclosed here, the contents of the inorganic solid and the glass frit are defined in volume ratios.

Second, the ink with an increased amount of the inorganic pigment is difficult to be cured and blurs after being printed on a glass substrate surface, and thus, fails to form a sharp image, disadvantageously. The inventors of the present disclosure assumed that the sharpness decrease due to ink blurring occurs because the increase in the content of the ink pigment reduces light transmittance (i.e., increases concealability) so that supply of sufficient light amount to a photocuring component in the ink is prevented, and thus, the ink is not cured immediately after printing. Based on this assumption, through an investigation of a preferable range of the inorganic pigment volume ratio to a photoinitiator in which an ink is photo-cured with a small amount of light, the inventors of the present disclosure found that blurring due to a failure of curing of the ink can be prevented and a sharp image can be formed by adjusting the volume ratio within a predetermined range.

An inkjet ink disclosed here has been made based on the foregoing findings. The inkjet ink is a glass substrate inkjet ink for use in drawing an image on a transparent glass substrate. The inkjet ink includes: an inorganic solid including an inorganic pigment and a glass frit, the inorganic pigment being used for developing a color except for black; a monomer component having a photocuring property; and a photoinitiator. In the inkjet ink disclosed here, a volume ratio of the inorganic solid in a case where a total volume of the inkjet ink is 100 volume % is 35 volume % or less, a volume ratio of the inorganic pigment in the case where the total volume of the inorganic solid is 100 volume % is 15 volume % or more and less than 90 volume %, and a volume ratio of the inorganic pigment to the photoinitiator is 11 times or less.

As described above, in the inkjet ink disclosed here, the "volume ratio of the inorganic solid to the ink total amount," the "volume ratio of the inorganic pigment to the total amount of the inorganic solid," and the "volume ratio of the inorganic pigment to the photoinitiator" are adjusted within predetermined ranges. Accordingly, an ejection property in printing, a photocuring property after printing, concealability of an image after calcination, and a fixing property to the glass substrate can be obtained at high levels. A black inorganic pigment has lower light transmittance than those of inorganic pigments of other colors, and thus, a necessary content of the photoinitiator in the black ink is different from those in inks of other colors. Thus, the inkjet ink disclosed here is directed to an ink using an inorganic pigment for a color except for black.

In a preferred aspect of the inkjet ink disclosed here, the inorganic pigment is an inorganic pigment that develops a color of cyan, magenta, or yellow. Examples of the inorganic pigment that develops a color except for black are three primary colors for subtractive process.

In a preferred aspect of the inkjet ink disclosed here, the volume ratio of the inorganic solid in the case where the total volume of the inkjet ink is 100 volume % is 15 volume % or more and 30 volume % or less. Accordingly, an ejection property in printing, concealability of an image after calcination, and a fixing property to the glass substrate can be obtained at high levels.

In a preferred aspect of the inkjet ink disclosed here, the volume ratio of the inorganic pigment in the case where the total volume of the inorganic solid is 100 volume % is 25 volume % or more and 85 volume % or less. Accordingly, concealability after calcination and a fixing property to the glass substrate can be obtained at higher levels.

In a preferred aspect of the inkjet ink disclosed here, the volume ratio of the inorganic pigment to the photoinitiator is 10.7 times or less. Accordingly, concealability after calcination and a photocuring property after printing can be obtained at higher levels.

In a preferred aspect of the inkjet ink disclosed here, the monomer component includes at least a monofunctional acrylate monomer including one acryloyl group or one methacryloyl group in a molecule, a monofunctional N-vinyl compound monomer in which one vinyl group is bound to a nitrogen (N) atom of a nitrogen-containing compound, and a polyfunctional vinyl ether monomer including at least two vinyl ether groups in a molecule. The use of the photocurable monomer component including these three types of monomers enables drawing of an image having a high fixing property to the surface of the printing target and high flexibility after fixing.

In the aspect including the three types of monomers, a volume ratio of the monomer component in the case where the total volume of the inkjet ink is 100 volume % is 50 volume % or more and 75 volume % or less. Accordingly, a fixing property to the surface of the printing target and flexibility after fixing can be obtained at high levels, and an image having a shiny gloss and high color developability after calcination can be formed.

In another aspect of the present disclosure, a method for producing a glass product having a decoration part is provided. The method of producing a glass product includes the steps of: performing inkjet printing on a surface of a glass substrate with the inkjet ink disclosed here; applying ultraviolet rays to the surface of the glass substrate and curing the inkjet ink adhering to the surface of the glass substrate; and calcining the glass substrate at a maximum calcination temperature of 450° C. to 1200° C.

The method for producing the glass product disclosed here uses the inkjet ink disclosed here. Accordingly, inkjet printing can be performed with a high ejection property so that a precise image can be printed on the surface of the glass substrate. In addition, since the ink has a high photocuring property, adhesion of coating and blurring of an image after printing can be prevented so that a sharp image can be formed. Furthermore, since the image (decoration part) after calcination has both concealability and a fixing property at high levels, aesthetic appearance can be maintained for a long period. That is, the production method disclosed here can easily produce a glass product with an aesthetic image.

The present disclosure also provides a method for producing transfer paper for a glass substrate (hereinafter also referred to simply as "transfer paper") to be used for a glass substrate. The method for producing the transfer paper includes: performing inkjet printing on a surface of a mount with the inkjet ink disclosed here; and applying ultraviolet rays to the surface of the mount and curing the inkjet ink adhering to the surface of the mount.

DESCRIPTION OF PREFERRED EMBODIMENTS

Figure 1:
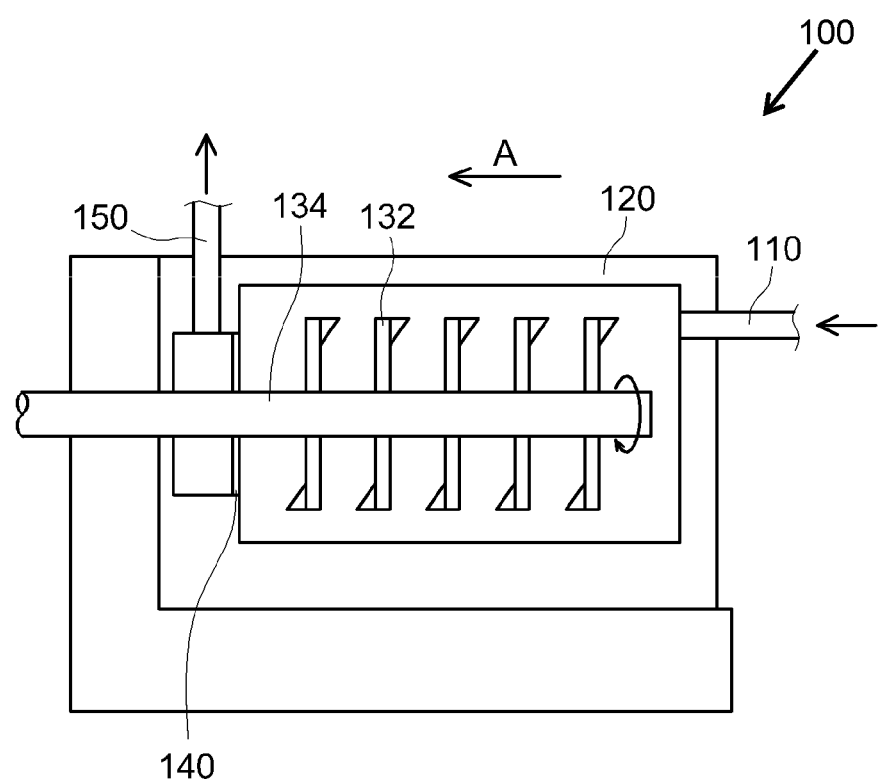
FIG. 1 is a cross-sectional view schematically illustrating a stirring mill for producing an inkjet ink.

A preferred embodiment of the present disclosure will be hereinafter described. Matters not specifically mentioned in the description but required for carrying out the present disclosure can be understood as matters of design variation of a person skilled in the art based on related art in the field. The present disclosure can be carried out on the basis of the contents disclosed in the description and common general knowledge in the field.

1. Inkjet Ink

An inkjet ink disclosed here is a glass substrate inkjet ink for use in drawing an image on a transparent glass substrate. The inkjet ink includes at least an inorganic solid, a monomer component (photocurable monomer component) having a photocuring property, and a photoinitiator. The components will be described below.

(1) Inorganic Solid

An inorganic solid is a component constituting a base material of an image (decoration part) after calcination, and includes an inorganic pigment and a glass frit.

(a) Inorganic Pigment

An inorganic pigment is added in order to develop an intended color on a substrate surface after calcination. The inorganic pigment can include, for example, a metal compound. The inorganic pigment has high heat resistance. Thus, when a glass substrate to which an ink adheres is calcined at 450° C. or more (e.g., 450° C. to 1200° C.), discoloration (fading) of the pigment can be prevented. Specific examples of the inorganic pigment include a composite metal compound including at least one metal element selected from the group consisting of Cu, Mn, Zr, Ti, Pr, Cr, Sb, Ni, Co, Al, and Cd. Among these materials, a Zr-based composite metal oxide (e.g., $ZrSiO_4$) including Zr as a main component is preferably used from the viewpoint of heat resistance.

The technique disclosed here is directed to an ink using an inorganic pigment that develops a color except for black. This is because a black inorganic pigment has a light transmittance lower than those of inorganic pigments of other colors, and thus, a content of the black inorganic pigment necessary for forming an image with high concealability is different from those of other colors. The color of the inorganic pigment used in the inkjet ink disclosed here can be any color except for black, and an intended color can be selected without any particular limitation. For example, in typical inkjet printing, inks of three primary colors for subtractive process, such as cyan, yellow, and magenta, are used as inks except for black. In the case of using the Zr-based composite metal oxide described above as the inorganic pigment, the Zr-based composite metal oxide is doped with predetermined metal elements so that inorganic pigments of the three colors describe above can be thereby obtained. For example, a Zr-based composite metal oxide for cyan can be $ZrSiO_4$—V (vanadium), a Zr-based composite metal oxide for yellow can be $ZrSiO_4$—Pr (praseodymium), and a Zr-based composite metal oxide for magenta can be $ZrSiO_4$—Fe. Other examples of an inorganic pigment of a color except for the three colors described above include an inorganic pigment of white. As the white inorganic pigment, $TiO_2$, $ZrO_2$, ZnO, or $ZrSiO_4$, for example, is preferably used.

The inorganic pigment can be typically particulate. The particle size of the particulate inorganic pigment is preferably adjusted as appropriate in consideration of the diameter of an ejection orifice of an inkjet apparatus described later. If the particle size of the inorganic pigment is excessively large, the ejection orifice might be clogged with the inorganic pigment so that an ink ejection property might decrease. Since a typical diameter of an ejection orifice of an inkjet apparatus is about 15 μm to 60 μm (e.g., 25 μm), the particle size of the inorganic pigment is preferably reduced such that a $D_{100}$ particle size (maximum particle size) corresponding to a cumulative 100 particles % from a smaller particle size side is 5 μm or less (preferably 1 μm or less). The $D_{100}$ particle size can be a value measured based on a particle size distribution measurement by dynamic light scattering.

The inorganic pigment may be inorganic particles mixed and dispersed in a glass frit described later. The inorganic particles can be, for example, nanometal particles. Example of the nanometal particles include nanogold particles, nanosilver particles, nanocopper particles, nanoplatinum particles, nanotitanium particles, and nanopalladium particles. The nanometal particles have specific optical features (e.g., a strong light absorption band) in ultraviolet to visible ranges due to surface plasmon resonance (SPR). For example, nanogold (Au) particles absorb light of a wavelength around 530 nm (e.g., green to light-blue light) and develops bluish red (reddish violet) called "marron." Thus, in the case of preparing an ink of red or violet, for example, nanogold particles are preferably used as nanometal particles. For example, nanosilver (Ag) particles absorb light of a wavelength around 420 nm (blue light) and develop yellow. Thus, in the case of preparing an ink of orange or yellow, for example, nanosilver particles are preferably used as nanometal particles. In a preferred aspect, a $D_{50}$ particle size of nanometal particles is 5 nm or more, and typically 10 nm or more, for example, 15 nm or more. In another preferred aspect, the $D_{50}$ particle size of nanometal particles is generally 80 nm or less, and typically 50 nm or less, for example, 30 nm or less. By setting the $D_{50}$ particle size in the range described above, absorbance of nanometal particles at a specific wavelength increases so that excellent color development can be achieved with a small amount of addition. In addition, a precise image with small color unevenness can be drawn.

(b) Glass Frit

A glass frit melts during calcination of a glass substrate to which an ink adheres, and is then solidified while being cooled after the calcination to thereby cause an inorganic pigment to be fixed to the substrate surface. A glass frit of the inkjet ink disclosed here preferably includes a glass material that covers an inorganic pigment after cooling and develops a shiny gloss.

Examples of a glass material that can have such properties include $SiO_2$—$B_2O_3$-based glass, $SiO_2$—RO (where RO is an oxide of a group-2 element, e.g., MgO, CaO, SrO, or BaO; the same hereinafter)-based glass, $SiO_2$—RO—$R_2O$ (where $R_2O$ is an oxide of an alkali metal element, e.g., $Li_2O$, $Na_2O$, $K_2O$, $Rb_2O$, $Cs_2O$, or $Fr_2O$, especially $Li_2O$; the same hereinafter)-based glass, $SiO_2$—$B_2O_3$—$R_2O$-based glass, $SiO_2$—RO—ZnO-based glass, $SiO_2$—RO—$ZrO_2$-based glass, $SiO_2$—RO—$Al_2O_3$-based glass, $SiO_2$—RO—$Bi_2O_3$-based glass, $SiO_2$—$R_2O$-based glass, $SiO_2$—ZnO-based glass, $SiO_2$—$ZrO_2$-based glass, $SiO_2$—$Al_2O_3$-based glass, RO—$R_2O$-based glass, and RO—ZnO-based glass. The glass material may include one or more components in addition to main components included in the designations above. The glass frit may include crystallized glass including crystal as well as typical amorphous glass.

In a preferred aspect, supposing the entire glass material is 100 mol %, $SiO_2$ occupies a half (50 mol %) or more of the material. A percentage of $SiO_2$ can be generally 80 mol % or less. From the viewpoint of increasing meltability of the glass frit, a component such as RO, $R_2O$, or $B_2O_3$ may be added. In a preferred aspect, supposing the entire glass material is 100 mol %, RO is 0 to 35 mol %. In another preferred aspect, supposing the entire glass material is 100 mol %, $R_2O$ is 0 to 10 mol %. In another preferred aspect, supposing the entire glass material is 100 mol %, $B_2O_3$ is 0 to 30 mol %.

In a preferred aspect, the glass material is constituted by a multi-component system including four or more components (e.g., five or more components). Accordingly, physical stability of an image after calcination increases. For example, a component such as $Al_2O_3$, ZnO, CaO, or $ZrO_2$ may be added in a proportion of, for example, 1 mol % or more. Accordingly, chemical durability and abrasion resistance of the decoration part can be increased. In a preferred aspect, supposing the entire glass material is 100 mol %, $Al_2O_3$ is 0 to 10 mol %. In a preferred aspect, supposing the entire glass material is 100 mol %, $ZrO_2$ is 0 to 10 mol %.

In a preferred example of the glass frit disclosed here, supposing the entire glass material is 100 mol %, a glass frit includes borosilicate glass having the following composition with a mole ratio in terms of oxide:

$SiO_2$ 40 to 70 mol % (e.g., 50 to 60 mol %);

$B_2O_3$ 10 to 40 mol % (e.g., 20 to 30 mol %);

$R_2O$ (at least one of $Li_2O$, $Na_2O$, $K_2O$, or $Rb_2O$) 3 to 20 mol % (e.g., 5 to 10 mol %);

$Al_2O_3$ 0 to 20 mol % (e.g., 5 to 10 mol %); and $ZrO_2$ 0 to 10 mol % (e.g., 3 to 6 mol %).

A percentage of $SiO_2$ in the entire glass matrix of borosilicate glass may be, for example, 40 mol % or more, and may be typically 70 mol % or less, for example, 65 mol % or less. A percentage of $B_2O_3$ in the entire glass matrix may be typically 10 mol % or more, for example, 15 mol % or more, and may be typically 40 mol % or less, for example, 35 mol % or less. A percentage of $R_2O$ in the entire glass matrix may be typically 3 mol % or more, for example, 6 mol % or more, and may be typically 20 mol % or less, for example, 15 mol % or less. In a preferred aspect, borosilicate glass includes $Li_2O$, $Na_2O$, and $K_2O$ as $R_2O$. A percentage of $Li_2O$ in the entire glass matrix can be, for example, 3 mol % or more and 6 mol % or less. A percentage of $K_2O$ in the entire glass matrix can be, for example, 0.5 mol % or more and 3 mol % or less. A percentage of $Na_2O$ in the entire glass matrix can be, for example, 0.5 mol % or more and 3 mol % or less. A percentage of $Al_2O_3$ in the entire glass matrix may be typically 3 mol % or more, and may be typically 20 mol % or less, for example, 15 mol % or less. A percentage of $ZrO_2$ in the entire glass matrix may be typically 1 mol % or more, and may be typically 10 mol % or less, for example, 8 mol % or less.

Borosilicate glass may include other additional components. Examples of the additional components include, in the state of an oxide, for example, BeO, MgO, CaO, SrO, BaO, ZnO, $Ag_2O$, $TiO_2$, $V_2O_5$, FeO, $Fe_2O_3$, $Fe_3O_4$, CuO, $Cu_2O$, $Nb_2O_5$, $P_2O_5$, $La_2O_3$, $CeO_2$, $Bi_2O_3$, and $Pb_2O_3$. The additional components may be included in a percentage of 10 mol % or less in total as a guide, supposing the entire glass matrix is 100 mol %.

Other examples of the glass frit disclosed here include a glass frit including a glass material 90 mol % or more of which has the following composition with a mole ratio in terms of oxide, supposing the entire glass is 100 mol %:

$SiO_2$ 45 to 70 mol % (e.g., 50 to 60 mol %);

$SnO_2$ 0.1 to 6 mol % (e.g., 1 to 5 mol %);

ZnO 1 to 15 mol % (e.g., 4 to 10 mol %);

RO (at least one of BeO, MgO, CaO, SrO, or BaO) 15 to 35 mol % (e.g., 20 to 30 mol %);

$R_2O$ (at least one of $Li_2O$, $Na_2O$, $K_2O$, or $Rb_2O$) 0 to 5 mol % (e.g., 1 to 5 mol %); and $B_2O_3$ 0 to 3 mol % (e.g., 0 to 1 mol %).

A percentage of $SiO_2$ in the entire glass matrix of the glass material having the above composition may be, for example, 50 mol % or more and may be typically 65 mol % or less, for example, 60 mol % or less. A percentage of $SnO_2$ in the entire glass matrix may be typically 0.5 mol % or more, for example, 1 mol % or more, and may be typically 5.5 mol % or less, for example, 5 mol % or less. A percentage of ZnO in the entire glass matrix may be typically 2 mol % or more, for example, 4 mol % or more, and may be typically 12 mol % or less, for example, 10 mol % or less. A percentage of RO in the entire glass matrix may be typically 18 mol % or more, for example, 20 mol % or more, and may be typically 32 mol % or less, for example, 30 mol % or less. A percentage of $R_2O$ in the entire glass matrix may be generally 0.1 mol % or more, for example, 1 mol % or more, and may be, for example, 3 mol % or less. A percentage of $B_2O_3$ in the entire glass matrix may be typically 1 mol % or less, for example, 0.1 mol % or less.

The glass frit may include additional components except for the components described above. Examples of the additional components include, in the form of, for example, an oxide, $Ag_2O$, $Al_2O_3$, $ZrO_2$, $TiO_2$, $V_2O_5$, FeO, $Fe_2O_3$, $Fe_3O_4$, CuO, $Cu_2O$, $Nb_2O_5$, $P_2O_5$, $La_2O_3$, $CeO_2$, and $Bi_2O_3$. The additional components may be included in a percentage of 10 mol % or less in total as a guide, supposing the entire glass matrix is 100 mol %.

A coefficient of linear thermal expansion (average coefficient of linear expansion measured in a temperature range from 25° C. to 500° C. with a thermomechanical analyzer; the same hereinafter) of the glass frit is preferably $10.0 \times 10^{-6} K^{-1}$ or less, for example. Accordingly, a difference in contraction factor between the glass frit and a decoration target (glass substrate) in calcination decreases so that the decoration part is less likely to suffer from separation or cracks. Although a yield point of the glass frit is not limited to a specific temperature, and can be, for example, 400° C. to 700° C. A glass transition point (Tg value based on differential scanning calorimetry; the same hereinafter) of the glass frit is not limited to a specific temperature, and can be, for example, 400° C. to 700° C.

The glass frit typically includes a particulate glass material. The particle size of the glass frit affects an ink viscosity, and thus, is preferably adjusted as appropriate in consideration of an ejection property from the inkjet apparatus. Specifically, if the ink includes a glass frit having a large particle size, the ejection orifice is likely to be clogged and the ejection property might decrease. In view of this, the particle size of the glass frit is preferably controlled such that the maximum particle size ($D_{100}$ particle size corresponding to a cumulative 100 particles % from a smaller particle size side) of the glass frit is 1 μm or less (preferably 0.85 μm or less).

(2) Photocurable Monomer Component

The inkjet ink disclosed here is a photocurable inkjet ink containing a monomer component having a photocuring property. The "photocurable monomer component" herein refers to a material including at least one monomer of resin that is typically in a liquid state and is polymerized (or cross-linked) to be cured upon application of light (e.g., ultraviolet rays). As such a photocurable monomer component, a monomer that can be used for a typical photocurable ink can be used without any particular limitation within the range where advantages of the present disclosure are not significantly impaired.

Preferred examples of the photocurable monomer component include a photocurable monomer component including (a) monofunctional acrylate monomer, (b) monofunctional N-vinyl compound monomer, and (c) polyfunctional vinyl ether monomer. The photocurable monomer component including the monomers (a) through (c) has a high fixing property (photocuring property) to a printing target, and thus, can be preferably used for various printing targets. The photocurable monomer components including the monomers (a) through (c) also has the advantage of high flexibility after photocuring, and thus, can be especially preferably used for a printing target that needs to be bent in application (e.g., transfer paper for an inorganic material).

(a) Monofunctional Acrylate Monomer

The monofunctional acrylate monomer is a compound including one an acryloyl group (CH$_2$=CHCOO—) or one methacryloyl group (CH$_2$=CCH$_3$COO—) in a molecule.

The monofunctional acrylate monomer has high dispersibility of an inorganic solid component and can suppress an increase in ink viscosity, and thus, can contribute to preparation of an ink having a preferable ejection property. Among monomers having photocuring properties, the monofunctional acrylate monomer has a relatively low stiffness (relatively high flexibility) after photocuring.

From the viewpoint of further increasing the ejection property and flexibility, the volume ratio of the monofunctional acrylate monomer in a case where the total volume of the photocurable monomer component is 100 volume % is preferably 40 volume % or more, more preferably 45 volume % or more, and even more preferably 50 volume % or more, and especially preferably 55 volume % or more, and is, for example, 60 volume % or more. On the other hand, the monofunctional acrylate monomer tends to have a relatively low photocuring property. Thus, from the viewpoint of obtaining a content of a monomer having a high photocuring property described later, the monofunctional acrylate monomer is preferably 96 volume % or less, more preferably 90 volume % or less, even more preferably 85 volume % or less, and especially preferably 80 volume % or less, and is, for example, 78 volume % or less.

Specific examples of the monofunctional acrylate monomer include benzyl acrylate, annular trimethylolpropane formal acrylate, phenoxyethyl acrylate, isobornyl acrylate, tetrahydrofurfuryl acrylate, methoxyethyl acrylate, cyclohexyl acrylate, ethyl carbitol acrylate, (2-methyl-2-ethyl-1,3-dioxolane-4-yl)methyl acrylate, hydroxyethyl acrylate, hydroxypropyl acrylate, 4-hydroxybutyl acrylate, methyl (meth)acrylate, ethyl acrylate, propyl acrylate, butyl acrylate, pentyl acrylate, n-stearyl acrylate, butoxy ethyl(meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, t-butyl cyclohexyl (meth) acrylate, isoamyl acrylate, lauryl (meth)acrylate, octyl acrylate, isooctyl (meth)acrylate, isononyl acrylate, decyl acrylate, isodecyl acrylate, tridecyl (meth)acrylate, isomyristylacrylate, isostearyl acrylate, 2-ethylhexyl acrylate, 2-ethylhexyl-diglycol acrylate, 4-hydroxybutyl acrylate, methoxydiethylene glycol acrylate, methoxytriethylene glycol acrylate, ethoxydiethylene glycol acrylate, 2-(2-ethoxyethoxy)ethyl acrylate, 2-ethylhexyl carbitol acrylate, and phenoxyethoxy ethyl acrylate. One or more (meth)acrylate compounds may be used alone or in combination. Among these compounds, benzyl acrylate, phenoxyethyl acrylate, and annular trimethylolpropane formal acrylate have especially high flexibility after photocuring, and thus, can favorably prevent occurrence of cracks in bending transfer paper.

(b) Monofunctional N-Vinyl Compound Monomer

The monofunctional N-vinyl compound monomer is a compound in which one vinyl group is bound to a nitrogen (N) atom of a nitrogen-containing compound. The "vinyl group" herein refers to CH$_2$=CR$^1$— (where R1 is a hydrogen atom or an organic group). The monofunctional N-vinyl compound monomer has high extensibility, and thus, can suppress occurrence of cracks in the drawn image. The monofunctional N-vinyl compound monomer has a high photocuring property, and has the function of increasing a fixing property to a surface of a printing target.

From the viewpoint of further increasing the fixing property, the volume ratio of the monofunctional N-vinyl compound monomer in the case where the total volume of the photocurable monomer component is 100 volume % is preferably 2 volume % or more, more preferably 3 volume % or more, even more preferably 4 volume % or more, and especially preferably 5 volume % or more. On the other hand, when the monofunctional N-vinyl compound monomer is added, flexibility of the ink after curing tends to decrease. In view of this, in the case of using transfer paper for an inorganic substrate, for example, the content of the monofunctional N-vinyl compound monomer is preferably reduced. From the viewpoint, the volume ratio of the monofunctional N-vinyl compound monomer is preferably 20 volume % or less, more preferably 17 volume % or less, even more preferably 15 volume % or less, and especially preferably 10 volume % or less.

The N-vinyl compound monomer is expressed by, for example, the following Equation (1):

$$CH_2=CR'—NR^2R^3 \qquad (1)$$

In Equation (1), R1 is an alkyl group with a hydrogen atom number and a carbon atom number of 1 to 4, a phenyl group, a benzyl group, or a halogen group. Among these materials, an alkyl group with a hydrogen atom number and a carbon atom number of 1 to 4 is preferable, and hydrogen atoms are especially preferable. In addition, each of R$^2$ and R$^3$ can be a group selected from the group consisting of a hydrogen atom, an alkyl group, an alkenyl group, an alkynyl group, an aralkyl group, an alkoxy group, an alkoxyalkyl group, an alkylol group, an acetyl group (CH$_3$CO—), and an aromatic group that may have substituents. The R$^2$ and R$^3$ may be the same or different from each other. The total number of carbon atoms in an alkyl group, an alkenyl group, an alkynyl group, an aralkyl group, an alkoxy group, an alkoxyalkyl group, an alkylol group, and an acetyl group that may have substituents can be 1 to 20. The alkyl group, the alkenyl group, the alkynyl group, the aralkyl group, the alkoxy group, the alkoxyalkyl group, the alkylol group, and the acetyl group that may have substituents can be a chain or annular, and is preferably a chain. The aromatic group is an aryl group that may have a substituent. The total number of carbon atoms in the aromatic group is 6 to 36. Substituents that the alkyl group, the alkenyl group, the alkynyl group, the aralkyl group, the alkoxy group, the alkoxyalkyl group, the alkylol group, the acetyl group, and the aromatic group can have, include halogen atoms such as a hydroxy group, fluorine atoms, and chlorine atoms. In Equation (1), R$^2$ and R$^3$ may be joined together to form an annular structure.

Preferred examples of the monofunctional N-vinyl compound monomer include N-vinyl-2-caprolactam, N-vinyl-2-pyrrolidone, N-vinyl-3-morpholinone, N-vinylpiperidine, N-vinylpyrrolidine, N-vinylaziridine, N-vinylazetidine, N-vinylimidazole, N-vinylmorpholine, N-vinylpyrazole, N-vinylvalerolactam, N-vinylcarbazole, N-vinylphthalimide, N-vinylformamide, N-vinylacetamide, N-methyl-N-vinylformamide, and N-methyl-N-vinylacetamide. Among these materials, N-vinyl-2-caprolactam has a high photocuring property among monofunctional N-vinyl compound monomers and thus can more favorably increase a fixing property to the surface of a printing target.

(c) Polyfunctional Vinyl Ether Monomer

The polyfunctional vinyl ether monomer is a compound including at least two vinyl ether groups in a molecule. The "vinyl ether group" herein refers to —O—CH=CHR1 (where R1 is a hydrogen atom or an organic group). The polyfunctional vinyl ether monomer including at least two vinyl ether groups has a high photocuring speed in UV irradiation and a high photocuring property, and thus, can increase a fixing property to the surface of a printing target. In addition, the polyfunctional vinyl ether monomer has low stiffness after curing among monomers having high photocuring properties and has high flexibility.

From the viewpoint of obtaining both a fixing property to a printing target and flexibility after photocuring, the volume ratio of the polyfunctional vinyl ether monomer in a case where the total volume of the monomer component is 100 volume % is preferably 2 volume % or more, more preferably 5 volume % or more, even more preferably 7 volume % or more, especially preferably 10 volume % or more, and is, for example, 15 volume % or more. On the other hand, if an excessive amount of the polyfunctional vinyl ether monomer is added, the amount of addition of the monofunctional acrylate monomer decreases so that flexibility after photocuring tends to decrease. In view of this, the upper limit of the volume ratio of the polyfunctional vinyl ether monomer is preferably 40 volume % or less, more preferably 35 volume % or less, even more preferably 30 volume % or less, especially preferably 25 volume % or less, and is, for example, 20 volume % or less.

Preferred examples of the polyfunctional vinyl ether monomer include ethylene glycol divinyl ether, diethylene glycol divinyl ether, triethylene glycol divinyl ether, tetraethylene glycol divinyl ether, polyethylene glycol divinyl ether, propylene glycol divinyl ether, dipropylene glycol divinyl ether, tripropylene glycol divinyl ether, polypropylene glycol divinyl ether, butanediol divinyl ether, neopentyl glycol divinyl ether, hexanediol divinyl ether, nonanediol divinyl ether, and 1,4-cyclohexanedimethanol divinyl ether. Among these materials, diethylene glycol divinyl ether, triethylene glycol divinyl ether, and 1,4-cyclohexanedimethanol divinyl ether obtain both a fixing property to the substrate surface and flexibility after photocuring at high levels, and thus, are especially preferable.

In the case of using the photocurable monomer component including the monomers (a) through (c), the volume ratio of the monomer component in the case where the total volume of the inkjet ink is 100 volume % is preferably 50 volume % or more, more preferably 52 volume % or more, even more preferably 58 volume % or more, and especially preferably 60 volume % or more. Accordingly, a fixing property to the surface of a printing target and flexibility after fixing can be achieved at higher levels. From the viewpoints of obtaining a sufficient content of an inorganic solid and forming an image (decoration part) having a shiny gloss and high color developability, the volume ratio of the monomer component is preferably 85 volume % or less, more preferably 80 volume % or less, even more preferably 75 volume % or less, and especially preferably 70 volume % or less.

(d) Other Monomers

As described above, as the photocurable monomer components in the inkjet ink disclosed here, monomer components that can be used for a typical photocurable inkjet ink are used without any particular limitation, and are not limited to the monomers (a) through (c) described above.

Examples of monomers other than the monomers (a) through (c) (other monomers) include a polyfunctional acrylate monomer including at least two acryloyl groups or methacryloyl groups in a molecule. Preferred examples of the polyfunctional acrylate monomer include 1,9-nonanediol di(meth)acrylate, 1,6-hexanediol di(meth)acrylate, 1,4-butanediol di(meth)acrylate, tricyclodecane dimethanol diacrylate, hydroxy pivalate neopentyl glycol diacrylate, triethylene glycol di(meth)acrylate, tetramethylene glycol di(meth)acrylate, tripropylene glycol di(meth)acrylate, polypropylene glycol di(meth)acrylate, 1,3-butanediol di(meth)acrylate, neopentyl glycol di(meth)acrylate, hexanediol di(meth)acrylate, cyclohexane-1,4-dimethanol di(meth)acrylate, cyclohexane-1,3-dimethanol di(meth)acrylate, 1,4-cyclohexanediol di(meth)acrylate, tetraethylene glycol di(meth)acrylate, pentaerythritol di(meth)acrylate, dipentaerythritol di(meth)acrylate, neopentyl glycol di(meth)acrylate, polytetramethylene glycol di(meth)acrylate, bisphenol AEO 3.8-molar adduct diacrylate, trimethylolpropane tri(meth)acrylate, trimethylolethane tri(meth)acrylate, trimethylol octane tri(meth)acrylate, pentaerythritol tri(meth)acrylate, trimethylolpropane polyethoxy tri(meth)acrylate, dipentaerythritol tri(meth)acrylate, dipentaerythritol propionate tri(meth)acrylate, tris(2-hydroxyethyl) isocyanurate tri(meth)acrylate, sorbitol tri (meth)acrylate, ditrimethylolpropane tetra(meth)acrylate, pentaerythritol polyethoxy tetra(meth)acrylate, pentaerythritol polyproxy tetra(meth)acrylate, sorbitol tetra(meth)acrylate, dipentaerythritol propionate tetra(meth)acrylate, ethoxylated pentaerythritol tetra(meth)acrylate, sorbitol penta(meth)acrylate, dipentaerythritol penta(meth)acrylate, dipentaerythritol hexa(meth)acrylate, and sorbitol hexa(meth)acrylate.

Examples of other monomers other than the polyfunctional acrylate monomer include butyl vinyl ether, butyl propenyl ether, butyl butenyl ether, hexyl vinyl ether, ethylhexyl vinyl ether, phenyl vinyl ether, benzyl vinyl ether, phenylallyl ether, vinyl acetate, acrylamide, methacrylamide, trimethylolpropane tri((meth)acryloyloxypropyl) ether, tri((meth)acryloyloxyethyl) isocyanurate, and a bisphenol A diglycidyl ether acrylic acid adduct.

(3) Photoinitiator

The inkjet ink disclosed here includes a photoinitiator. The photoinitiator absorbs light to be activated, and generates reaction initiators such as radical molecules and hydrogen ions. When these reaction initiators act on photocurable monomers to thereby accelerate polymerization reaction and cross-linkage reaction of the photocurable monomers. That is, an ink that can be easily cured even with a small amount of light can be prepared by increasing the content of the photoinitiator. As the photoinitiator, a conventional photoinitiator can be used without any particular limitation. Examples of the photoinitiator include a radical-based photoinitiator such as an alkylphenone-based photoinitiator and an acylphosphine oxide-based photoinitiator. Preferred examples of the alkylphenone-based photoinitiator include α-aminoalkylphenone-based photoinitiators (e.g., 2-methyl-1-(4-methylthiophenyl)-2-morpholinopropane-1-one, 2-benzyl-2-dimethylamino-1-(4-morpholinophenyl)-butanone-1, and 2-(dimethylamino)-2-[(4-methylphenyl)methyl]-1-[4-(4-morpholinyl)phenyl]-1-butanone). Other examples of the alkylphenone-based photoinitiator include α-hydroxyalkylphenone-based photoinitiators (e.g., 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, and 2-hydroxy-1-{4-[4-(2-hydroxy-2-methyl-propionyl)-benzyl]phenyl}-2-methyl-propane-1-one). Among the photoinitiators described above, the α-aminoalkylphenone-based photoinitiators such as 2-methyl-1-(4-methylthiophenyl)-2-morpholinopropane-1-one have high reactivity to increase a curing speed of an ink and have a high thin-film curing property and a high surface hardening property, and thus, are especially preferably used.

(4) Other Components

The inkjet ink disclosed here may additionally include a known additive (e.g., a disperser, a polymerization inhibitor, a binder, or a viscosity adjuster) that can be used for an inkjet ink (typically, an inkjet ink for a glass substrate and a photocuring inkjet ink) within the range that does not impair advantages of the present disclosure. The content of the additive may be approximately set depending on a purpose of the additive, and is not a feature of the present disclosure, and thus, will not be described in detail.

(a) Disperser

The inkjet ink disclosed here may include a disperser. As a disperser, a cation-based disperser is used, for example. The cation-based disperser efficiently adheres to the surface of an inorganic pigment by acid-base reaction, and thus, suppresses agglomeration of the inorganic pigment to disperse the inorganic pigment favorably unlike other dispersers such as a phosphoric acid-based disperser. Examples of the cation-based disperser include an amine-based disperser. The amine-based disperser can prevent aggregation of an inorganic pigment due to steric hindrance and can stabilize the inorganic pigment. In addition, since the same electric charges can be applied to inorganic pigment particles, agglomeration of the inorganic pigment can also be favorably prevented in this respect. Accordingly, the viscosity of the ink can be reduced so that printing performance can be significantly increased. Examples of the amine-based disperser include an aliphatic amine-based disperser and a polyester amine-based disperse, and DISPERBYK-2013 produced by BYK JAPAN KK, for example, is preferably used.

(b) Polymerization Inhibitor

The inkjet ink disclosed here may include a polymerization inhibitor. The addition of the polymerization inhibitor can suppress polymerization and curing of the photocurable monomer component before use, and thus, the ink can be easily stored. As the polymerization inhibitor, a material conventionally used in the field of the photocurable inkjet ink can be used without any particular limitation as long as the material does not significantly reduce a photocuring property of the photocurable monomer component including the monomers (a) through (c) described above and reduce advantages of the technique disclosed here. Examples of the polymerization inhibitor include hydroquinone, methoquinone, di-t-butyl hydroquinone, P-methoxyphenol, butyl hydroxytoluene, and nitrosamine salt. Among components included in these inhibitors, N-nitrophenyl hydroxylamine aluminum salt is especially preferable because of high stability in long-term storage.

(5) Contents of Components

The inkjet ink disclosed here is characterized by controlling (a) the volume ratio of the inorganic solid to the ink total amount, (b) the volume ratio of the inorganic pigment to the total amount of the inorganic solid, and (c) the volume ratio of the inorganic pigment to the photoinitiator within predetermined ranges. These components will now be described.

(a) Volume Ratio of Inorganic Solid to Ink Total Amount

First, in the inkjet ink disclosed here, the volume ratio of the inorganic solid in the case where the total volume of the inkjet ink is 100 volume % is 35 volume % or less. The "volume of the inorganic solid" refers to the total volume of the inorganic pigment and the glass frit. As the volume of the inorganic solid increases, the ink viscosity tends to increase. The inorganic pigment and the glass frit included in the inorganic solid can be of various types, and have various specific gravities. Thus, in this embodiment, not the "weight" but the "mass" of the inorganic solid is adjusted.

Although described in detail later, the inkjet ink disclosed here includes an increased amount of an inorganic pigment in order to form an image with high concealability. Even such an ink including a large amount of inorganic pigment can obtain a low ink viscosity suitable for inkjet printing (typically less than 110 Pas, preferably 70 Pas or less) by reducing the volume ratio of the inorganic solid to the ink total amount to 35 volume % or less. From the viewpoint of more favorably reducing the ink viscosity, the volume ratio of the inorganic solid is preferably 32 volume % or less, more preferably 30 volume % or less, even more preferably 28 volume % or less, and especially preferably 25 volume % or less. On the other hand, from the viewpoints of obtaining sufficiently high concealability after calcination and sufficiently high fixing property, the lower limit of the volume ratio of the inorganic solid is preferably 10 volume % or more, more preferably 12 volume % or more, even more preferably 15 volume % or more, and especially preferably 16 volume % or more.

(b) Volume Ratio of Inorganic Pigment to Total Amount of Inorganic Solid

Next, in the inkjet ink disclosed here, the volume of the inorganic pigment in the case where the total volume of the inorganic solid is 100 volume % is adjusted to 15 volume % or more. By including a large amount of inorganic pigment in this manner, an image with high concealability can be formed. From the viewpoint of forming an image with higher concealability, the volume ratio of the inorganic pigment is preferably 17.5 volume % or more, more preferably 20 volume % or more, even more preferably 25 volume % or more, and especially preferably 27.5 volume % or more. On the other hand, if the volume ratio of the inorganic pigment to the total amount of the inorganic solid is excessively increased, a decreased amount of the glass frit might reduce a fixing property of an image after calcination. From this viewpoint, the upper limit of the volume ratio of the inorganic pigment is set to be less than 90 volume %. From the viewpoint of ensuring fixing of an image after calcination, the upper limit of the volume ratio of volume ratio of the inorganic pigment is preferably 85 volume % or less, more preferably 80 volume % or less, and especially preferably 70 volume % or less.

(c) Volume Ratio of Inorganic Pigment to Photoinitiator

In the technique disclosed here, even for an ink including an increased amount of the inorganic pigment, the volume ratio of the inorganic pigment to the photoinitiator is defined in order to obtain appropriate photocuring effect. An experiment conducted by the inventors of the present disclosure confirmed that even for inks each having the same volume ratio of an inorganic solid and a photoinitiator, an ink having a larger volume of an inorganic pigment shows lower photocuring property. While there is no intention to limit the technique disclosed here, such a phenomenon is supposed to be because an insufficient light amount is supplied to photocurable monomers in an ink having a high volume ratio of an inorganic pigment and has high concealability. On the other hand, in the inkjet ink disclosed here, the amount of addition of the photoinitiator is defined in consideration of the volume ratio of the inorganic pigment that is a cause of decrease in photocuring property. Specifically, in the inkjet ink disclosed here, the volume ratio of the inorganic pigment to the photoinitiator is adjusted to 11 times or less. Accordingly, although a large amount of the inorganic pigment is included, sufficient photocuring is exhibited, and a sharp image without blurring can be formed. From the viewpoint of obtaining a more favorable photocuring property, the volume ratio of the inorganic pigment to the photoinitiator is preferably 10.7 times or less, more preferably 10 times or less, and even more preferably 8.4 times or less. On the other hand, the lower limit of the volume ratio of the inorganic pigment to the photoinitiator is not specifically limited, and may be 0.3 times or more, 1.1 times or more, 1.3 times or more, and 1.7 times or more.

As described above, in the inkjet ink disclosed here, (a) the volume ratio of the inorganic solid to the ink total amount, (b) the volume ratio of the inorganic pigment to the total amount of the inorganic solid, and (c) the volume ratio of the inorganic pigment to the photoinitiator are controlled within predetermined ranges. The inkjet ink can obtain an ejection property in printing, a photocuring property after printing, concealability of an image after calcination, and a fixing property to a glass substrate at high levels, and thus, enables easy production of a glass product with an aesthetic image.

2. Preparation of Inkjet Ink

A procedure of preparing (producing) the inkjet ink disclosed here will now be described. The inkjet ink disclosed here can be prepared by mixing the materials described above in predetermined proportions and then milling and dispersing the inorganic solid. FIG. 1 is a cross-sectional view schematically illustrating a stirring mill for use in production of an inkjet ink. The following description is not intended to limit the inkjet ink disclosed here.

First, in producing the inkjet ink disclosed here, the materials described above are weighed and mixed, thereby preparing slurry as a precursor of the ink.

Next, with a stirring mill 100 as illustrated in FIG. 1, stirring of the slurry and milling of an inorganic solid (an inorganic pigment and a glass frit) are performed. Specifically, milling beads (e.g., zirconia beads with a diameter of 0.5 mm) are added to the slurry, and then the slurry is supplied to a stirring vessel 120 from a supply port 110. The stirring vessel 120 houses a shaft 134 having a plurality of stirring blades 132. One end of the shaft 134 is attached to a motor (not shown), and the motor is driven to rotate the shaft 134 so that the slurry is stirred while being sent to a downstream side in a liquid feeding direction A with the stirring blades 132. During the stirring, the inorganic solid is milled by the milling beads added to the slurry so that the atomized inorganic solid is dispersed into the slurry.

The slurry sent to the downstream side in the liquid feeding direction A then passes through a filter 140. Accordingly, the milling beads and a non-atomized inorganic solid are caught by the filter 140, and an inkjet ink in which the atomized inorganic solid is sufficiently dispersed is ejected from an ejection port 150. The pore size of the filter 140 at this time is adjusted so that a maximum particle size of the inorganic solid in the inkjet ink can be controlled.

3. Application of Inkjet Ink

Next, application of the inkjet ink disclosed here will be described. As described above, the inkjet ink disclosed here is used for drawing an image on a transparent glass substrate. The term of "being used for drawing an image on a transparent glass substrate" herein is a situation including not only a state where the ink directly is caused to adhere to the surface of the glass substrate but also a state where the ink is caused to indirectly adhere to the surface of the glass substrate with an interposition of, for example, transfer paper. That is, the inkjet ink disclosed here can be used for printing on glass substrate transfer paper (production of transfer paper) and printing on a glass substrate surface (production of a glass production).

(1) Production of Transfer Paper

Figure 2:
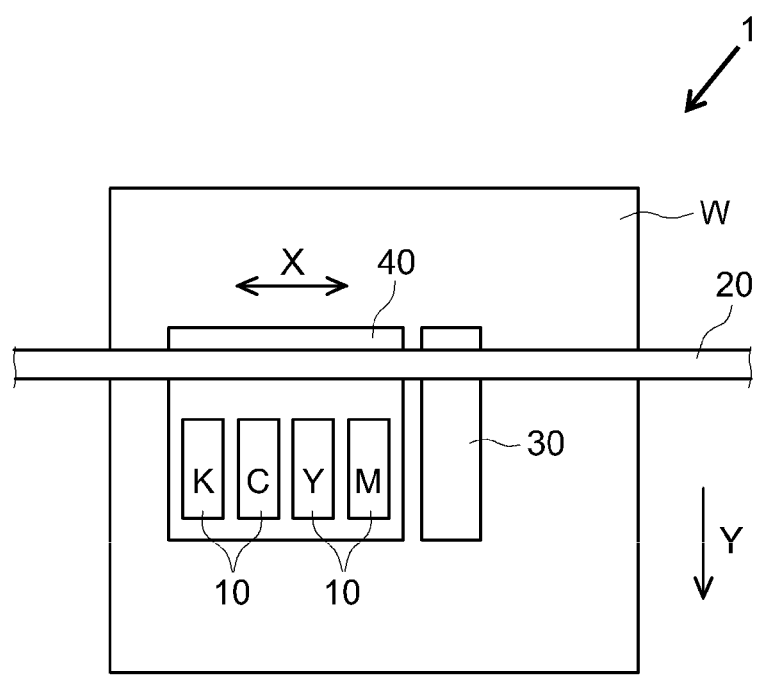
FIG. 2 is an overall view schematically illustrating an example of an inkjet apparatus.
Figure 3:
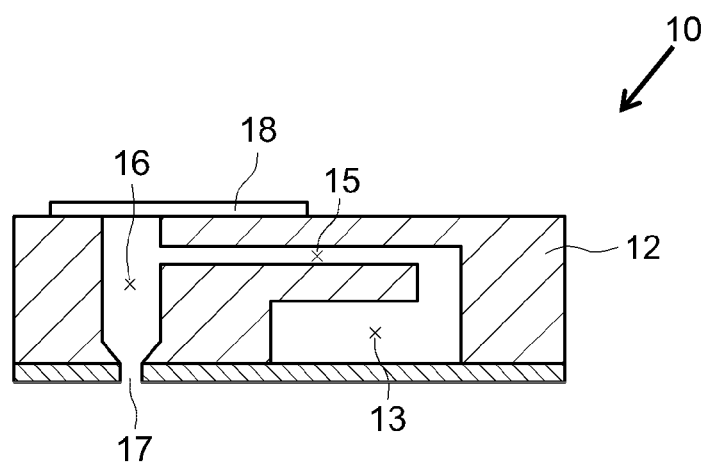
FIG. 3 is a cross-sectional view schematically illustrating an inkjet head of the inkjet apparatus in FIG. 2.

A method for producing glass substrate transfer paper (printing method for drawing an image on the surface of transfer paper) with the inkjet ink disclosed here will be described. FIG. 2 is an overall view schematically illustrating an example of an inkjet apparatus. FIG. 3 is a cross-sectional view schematically illustrating an ink jet head of the inkjet apparatus in FIG. 2.

The inkjet ink disclosed here is stored in inkjet heads 10 of the inkjet apparatus 1 illustrated in FIG. 2. The inkjet apparatus 1 includes four inkjet heads 10. The inkjet heads 10 store inks of four different colors of black (K), cyan (C), yellow (Y), and magenta (M). The inkjet ink disclosed here is stored in the inkjet heads 10 of cyan (C), yellow (Y), and magenta (M), except for black (K). The inkjet heads 10 are housed in a printing cartridge 40. The printing cartridge 40 is inserted in a guide shaft 20 and is configured to reciprocate along an axial direction X of the guide shaft 20. Although not shown, the inkjet apparatus 1 includes a moving means for moving the guide shaft 20 in a vertical direction Y. In this manner, the ink can be ejected from the inkjet heads 10 toward a desired position on a mount W of transfer paper.

The inkjet heads 10 illustrated in FIG. 2 are, for example, a piezo inkjet head as illustrated in FIG. 3. Each of the piezo inkjet heads 10 includes a storage 13 for storing ink in a case 12, and the storage 13 communicates with an ejection part 16 through a liquid feeding path 15. The ejection part 16 has an ejection orifice 17 that is open to the outside of the case 12, and includes a piezoelectric device 18 facing the ejection orifice 17. In each of the inkjet heads 10, the piezoelectric device 18 is caused to vibrate so that ink in the ejection part 16 is ejected from the ejection orifice 17 toward the mount W (see FIG. 2).

The guide shaft 20 of the inkjet apparatus 1 illustrated in FIG. 2 is provided with an UV irradiator 30. The UV irradiator 30 is disposed adjacent to the printing cartridge 40, moves together with reciprocation of the printing cartridge 40, and applies UV light to the mount V to which the ink adheres. Accordingly, the ink is cured immediately after the ink adheres to the surface of the mount W, and thus, ink with a sufficient thickness can be fixed to the surface of transfer paper (mount W).

As described above, in the inkjet ink disclosed here, the volume of the inorganic solid to the total volume of the inkjet ink is adjusted to 35 volume % or less. Accordingly, a low ink viscosity can be maintained so that ink can be accurately ejected from the ejection orifice 17, and a precise image can be drawn on the surface of a printing target (transfer paper in this example). In addition, in the inkjet ink disclosed here, the volume ratio of the inorganic pigment to the photoinitiator is adjusted to 11 times or less. Accordingly, a high photocuring property is obtained so that ink after UV irradiation can be immediately cured and blurring of the ink can be prevented.

In producing the transfer paper, the photocurable monomer component including the monomers (a) through (c) described above is preferably used. Accordingly, an image (cured ink) having sufficient flexibility can be drawn, and thus, cracks in an image occurring in bending transfer paper can be prevented.

(2) Method for Producing Glass Product

Next, a method for producing a glass product with the inkjet ink disclosed here will be described. The production method includes the step of causing the inkjet ink disclosed here to adhere to a surface of a glass substrate and the step of calcining the glass substrate.

A glass substrate produced by this method is not limited to a specific method as long as an image is formed on a surface of a glass substrate. For example, the glass product is not limited to everyday items such as table ware, windowpanes, and cooking appliances, and may be industrial items such as electronic equipment and displays. The glass substrate as a printing target is not specifically limited, and a general glass member can be used without any particular limitation. In consideration of a calcination process described later, a glass substrate having a softening point of 500° C. or more, (more preferably 600° C. or more, even more preferably 700° C. or more) is preferably used. On the other hand, the upper limit of the softening point of the glass substrate is not limited to a specific temperature. For example, the upper limit of the softening point of the glass substrate may be 1600° C. or less, 1200° C. or less, or 1000° C. or less First, in the production method disclosed here, an inkjet ink is caused to adhere to a surface of a glass substrate. A technique for causing the ink to the glass substrate is not specifically limited. The ink may be caused to adhere directly to the surface of the glass substrate with an inkjet apparatus or the ink may be caused to adhere indirectly with an interposition of the transfer paper described above. In a case where the inkjet apparatus is used to cause the ink to adhere directly to the surface of the glass substrate, the ink is preferably ejected toward the surface of the glass substrate according to the same procedure as that in the "production of transfer paper" described above.

In the production method disclosed here, the glass substrate to which the ink adheres is calcined in a condition in which a maximum calcination temperature is set within a range of 450° C. to 1200° C. (preferably 500° C. to 1000° C., more preferably 550° C. to 850° C.). Accordingly, a resin component as a cured monomer is burnt, and a glass frit in an inorganic solid melts. The glass substrate is cooled after the calcination so that the molten glass frit is solidified, and the inorganic pigment is fixed to a substrate surface. At this time, in the production method disclosed here, since the ink in which the volume of the inorganic pigment to the total volume of the inorganic solid is adjusted to 15 volume % or more, an aesthetic image with high concealability can be formed. In addition, since the volume of the inorganic pigment to the total volume of the inorganic solid is adjusted to be less than 90 volume %, the inorganic pigment can be appropriately fixed to the surface of the glass substrate.

Test Examples

Test examples of the present disclosure will be described, but these examples are not intended to limit the present disclosure.

<Inkjet Ink>

In this test, 18 types of inkjet inks (Examples 1 through 18) each including an inorganic solid, a photocurable monomer, and a photoinitiator were prepared. Specifically, slurry was prepared by mixing materials in volume ratios shown in Tables 1 and 2, and subjected to milling and dispersion with milling beads (zirconia beads with a diameter of 0.5 mm), thereby obtaining inks of Examples 1 through 18. The volume ratios in the tables are values in the case where the total volume of the ink is 100 volume %, except where otherwise specified. In the test examples, a disperser (produced by BYK JAPAN KK: DISPERBYK-2013) and a polymerization inhibitor (produced by FUJIFILM Wako Pure Chemical Corporation: Q-1301 (N-nitroso-N-phenyl hydroxylamine aluminum)) were added as other additives. The volume ratios of these additives are also shown in Tables 1 and 2. The volume ratio of each component is a value rounded to the second decimal place.

In the inorganic solid in this test examples, "yellow" is a rutile-type titania-based yellow inorganic pigment. "Cyan" is an inorganic pigment of zircon-based cyan. "White" is a titania-based white inorganic pigment. "Glass frit" is borosilicate glass having a softening point of 550° C.

The "photocuring component" in Tables 1 and 2 is a mixture of a monofunctional acrylate monomer, a monofunctional N-vinyl compound monomer, a polyfunctional acrylate monomer, and a polyfunctional vinyl ether monomer in a predetermined volume ratio. As the monofunctional acrylate monomer, a mixture of isobornyl acrylate (produced by OSAKA ORGANIC CHEMICAL INDUSTRY LTD.), benzyl acrylate (produced by OSAKA ORGANIC CHEMICAL INDUSTRY LTD.), phenoxyethyl acrylate (produced by OSAKA ORGANIC CHEMICAL INDUSTRY LTD.), and annular trimethylolpropane formal acrylate (produced by OSAKA ORGANIC CHEMICAL INDUSTRY LTD.) was used. As the monofunctional N-vinyl compound monomer, N-vinylcaprolactam (produced by Tokyo Chemical Industry Co., Ltd.) was used. As the polyfunctional acrylate monomer, 1,9-nonanediol diacrylate (produced by OSAKA ORGANIC CHEMICAL INDUSTRY LTD.) was used. As the polyfunctional vinyl ether monomer, a mixture of triethylene glycol divinyl ether (produced by NIPPON CARBIDE INDUSTRIES CO., INC.), diethylene glycol divinyl ether (produced by NIPPON CARBIDE INDUSTRIES CO., INC.), and 1,4-cyclohexanedimethanol divinyl ether (produced by NIPPON CARBIDE INDUSTRIES CO., INC.) was used.

As the photoinitiator, an acylphosphine oxide-based photoinitiator (produced by IGM RESINS: Omnirad 819) was used.

In each of the test examples, the "volume ratio of the inorganic solid to the ink total amount," the "volume ratio of the inorganic pigment to the inorganic solid," and the "volume ratio of the inorganic pigment to the photoinitiator" were calculated. The "volume ratio of the inorganic solid to the ink total amount" is a value in the case where the ink total amount is 100 volume %, and the "volume ratio of the inorganic pigment to the inorganic solid" is a value in the case where the total amount of the inorganic solid is 100 volume %. The "volume ratio of the inorganic pigment to the photoinitiator" is a value (multiple) obtained by dividing the volume of the inorganic pigment by the volume of the photoinitiator.

<Evaluation Test>

(1) Ink Viscosity Evaluation

A prepared ink viscosity of each example was measured with a type-B viscometer. In the measurement, the ink temperature was set at 25° C., and the rotation speed of a spindle was set at 5 rpm. An ink having a viscosity less than 70 mPa·s was evaluated as "good," an ink having a viscosity of 70 mPa·s or more and less than 110 mPa·s was evaluated as "acceptable," and an ink having a viscosity of 110 mPa·s or more was evaluated as "unacceptable." Tables 1 and 2 show valuation results.

(2) Printing of Image

The ink of each example was printed on the surface of a glass substrate (softening point: 820° C.) with a thickness of 5 mm. Specifically, the ink was ejected onto the surface of the glass substrate with an inkjet apparatus (produced by FUJIFILM Corporation: material printer (DMP-2831)), and then irradiated with UV light (wavelength: 395 nm) for one second, thereby drawing an image with a thickness of 5 to 50 µm on the surface of the glass substrate. The glass substrate was then calcined at 700° C., thereby producing a glass product with a decoration part.

(3) Fixing Evaluation

An adhesion strength of the decoration part after calcination was measured to evaluate a fixing property of ink to the glass substrate. Specifically, in conformity with JIS K5600-5-4, a scratch hardness test with a pencil method was conducted on the decoration part. A case where a pencil hardness of the decoration part was 3H or more was evaluated as "good," and a case where the pencil hardness was less than 3H was evaluated as "unacceptable." Tables 1 and 2 show valuation results.

(4) Concealability Evaluation

Concealability of the decoration part formed on the glass substrate was evaluated by visual observation. Specifically, a paper sheet with written characters was placed on the bottom side of the glass substrate, and the decoration part was observed from the written side. A case where no characters were seen was evaluated as "good," a case where the characters were visible but cannot be read was evaluated as "acceptable," and a case where the decoration part was transparent enough to read characters therethrough was evaluated as "unacceptable." Tables 1 and 2 show valuation results.

(5) UV Curing Evaluation

Here, UV curing of ink after UV radiation and before calcination was evaluated. Specifically, a wipe was lightly pressed against the UV-irradiated glass substrate. A case where no ink was transferred to the wipe was evaluated as "good," a case where a small amount of ink was transferred to the wipe but appearance of an image has no disturbance (blurring) was evaluated as "acceptable," and a case where a large amount of ink was transferred to the wipe and appearance of an image has disturbance was evaluated as "unacceptable." Tables 1 and 2 show valuation results.

TABLE 1

| | | | EXAMPLE 1 | EXAMPLE 2 | EXAMPLE 3 | EXAMPLE 4 | EXAMPLE 5 |
|---|---|---|---|---|---|---|---|
| COMPOSITION (VOLUME %) | PIGMENT | YELLOW | 4.0 | 5.5 | 7.5 | 10.0 | — |
| | | CYAN | — | — | — | — | 10.0 |
| | | WHITE | — | — | — | — | — |
| | GLASS FRIT | | 16.0 | 14.5 | 12.5 | 10.0 | 10.0 |
| | DISPERSER | | 10.8 | 10.8 | 10.8 | 10.8 | 10.8 |
| | PHOTOCURABLE MONOMER | | 66.6 | 66.6 | 66.6 | 66.6 | 67.8 |
| | PHOTOINITIATOR | | 2.3 | 2.3 | 2.3 | 2.3 | 1.2 |
| | POLYMERIZATION INHIBITOR | | 0.2 | 0.2 | 0.2 | 0.2 | 0.2 |
| | TOTAL | | 100.0 | 99.9 | 99.9 | 99.9 | 100.0 |
| VOLUME RATIO OF INORGANIC SOLID TO INK TOTAL AMOUNT (VOLUME %) | | | 20.0 | 20.0 | 20.0 | 20.0 | 20.0 |
| VOLUME RATIO OF INORGANIC PIGMENT TO INORGANIC SOLID (VOLUME %) | | | 20.0 | 27.5 | 37.5 | 50.0 | 50.0 |
| VOLUME RATIO (MULTIPLE) OF INORGANIC PIGMENT TO PHOTOINITIATOR | | | 1.7 | 2.4 | 3.3 | 4.3 | 8.3 |
| EVALUATION | INK VISCOSITY | | GOOD | GOOD | GOOD | GOOD | GOOD |
| | FIXING PROPERTY | | GOOD | GOOD | GOOD | GOOD | GOOD |
| | CONCEALABILITY | | ACCEPTABLE | GOOD | GOOD | GOOD | GOOD |
| | PHOTOCURING PROPERTY | | GOOD | GOOD | GOOD | GOOD | GOOD |
| | TOTAL EVALUATION | | ACCEPTABLE | GOOD | GOOD | GOOD | GOOD |

| | | | EXAMPLE 6 | EXAMPLE 7 | EXAMPLE 8 | EXAMPLE 9 |
|---|---|---|---|---|---|---|
| COMPOSITION (VOLUME %) | PIGMENT | YELLOW | 10.3 | 10.0 | — | 8.3 |
| | | CYAN | — | — | 9.7 | — |
| | | WHITE | — | — | — | — |
| | GLASS FRIT | | 10.3 | 10.0 | 9.7 | 21.8 |
| | DISPERSER | | 5.5 | 10.8 | 13.1 | 14.7 |
| | PHOTOCURABLE MONOMER | | 68.6 | 65.5 | 66.0 | 52.8 |
| | PHOTOINITIATOR | | 5.1 | 3.5 | 1.2 | 2.3 |
| | POLYMERIZATION INHIBITOR | | 0.2 | 0.2 | 0.2 | 0.2 |
| | TOTAL | | 100.0 | 100.0 | 99.9 | 100.1 |
| VOLUME RATIO OF INORGANIC SOLID TO INK TOTAL AMOUNT (VOLUME %) | | | 20.6 | 20.0 | 19.4 | 30.1 |
| VOLUME RATIO OF INORGANIC PIGMENT TO INORGANIC SOLID (VOLUME %) | | | 50.0 | 50.0 | 50.0 | 27.6 |
| VOLUME RATIO (MULTIPLE) OF INORGANIC PIGMENT TO PHOTOINITIATOR | | | 2.0 | 2.9 | 8.1 | 3.6 |
| EVALUATION | INK VISCOSITY | | GOOD | GOOD | GOOD | ACCEPTABLE |
| | FIXING PROPERTY | | GOOD | GOOD | GOOD | GOOD |
| | CONCEALABILITY | | GOOD | GOOD | GOOD | GOOD |
| | PHOTOCURING PROPERTY | | GOOD | GOOD | GOOD | GOOD |
| | TOTAL EVALUATION | | GOOD | GOOD | GOOD | ACCEPTABLE |

TABLE 2

|  |  |  | EXAMPLE 10 | EXAMPLE 11 | EXAMPLE 12 | EXAMPLE 13 | EXAMPLE 14 |
|---|---|---|---|---|---|---|---|
| COMPOSITION (VOLUME %) | PIGMENT | YELLOW | — | 6.0 | — | — | — |
|  |  | CYAN | 17.5 | — | — | — | 3.0 |
|  |  | WHITE | — | — | 16.9 | 3.0 | — |
|  | GLASS FRIT |  | 7.5 | 10.0 | 3.0 | 17.0 | 12.0 |
|  | DISPERSER |  | 14.4 | 8.1 | 16.9 | 12.3 | 7.2 |
|  | PHOTOCURABLE MONOMER |  | 58.7 | 75.0 | 60.8 | 65.1 | 67.6 |
|  | PHOTOINITIATOR |  | 1.8 | 0.6 | 2.1 | 2.3 | 10.0 |
|  | POLYMERIZATION INHIBITOR |  | 0.2 | 0.2 | 0.2 | 0.2 | 0.2 |
|  | TOTAL |  | 100.0 | 99.9 | 99.9 | 99.9 | 100.0 |
| VOLUME RATIO OF INORGANIC SOLID TO INK TOTAL AMOUNT (VOLUME %) |  |  | 25.0 | 16.0 | 19.9 | 20.0 | 15.0 |
| VOLUME RATIO OF INORGANIC PIGMENT TO INORGANIC SOLID (VOLUME %) |  |  | 70.0 | 37.5 | 84.9 | 15.2 | 20.0 |
| VOLUME RATIO (MULTIPLE) OF INORGANIC PIGMENT TO PHOTOINITIATOR |  |  | 9.7 | 10.0 | 8.0 | 1.3 | 0.3 |
| EVALUATION | INK VISCOSITY |  | GOOD | GOOD | GOOD | GOOD | GOOD |
|  | FIXING PROPERTY |  | GOOD | GOOD | GOOD | GOOD | GOOD |
|  | CONCEALABILITY |  | GOOD | GOOD | GOOD | ACCEPTABLE | ACCEPTABLE |
|  | PHOTOCURING PROPERTY |  | GOOD | ACCEPTABLE | GOOD | GOOD | GOOD |
|  | TOTAL EVALUATION |  | GOOD | ACCEPTABLE | GOOD | ACCEPTABLE | ACCEPTABLE |

|  |  |  | EXAMPLE 15 | EXAMPLE 16 | EXAMPLE 17 | EXAMPLE 18 |
|---|---|---|---|---|---|---|
| COMPOSITION (VOLUME %) | PIGMENT | YELLOW | 2.6 | — | — | 9.7 |
|  |  | CYAN | — | 14.0 | — | — |
|  |  | WHITE | — | — | 18.0 | — |
|  | GLASS FRIT |  | 17.4 | 6.0 | 2.0 | 25.5 |
|  | DISPERSER |  | 10.8 | 10.8 | 17.3 | 17.3 |
|  | PHOTOCURABLE MONOMER |  | 66.6 | 67.8 | 60.4 | 45.1 |
|  | PHOTOINITIATOR |  | 2.3 | 1.2 | 2.1 | 2.3 |
|  | POLYMERIZATION INHIBITOR |  | 0.2 | 0.2 | 0.2 | 0.2 |
|  | TOTAL |  | 99.9 | 100.0 | 100.0 | 100.1 |
| VOLUME RATIO OF INORGANIC SOLID TO INK TOTAL AMOUNT (VOLUME %) |  |  | 20.0 | 20.0 | 20.0 | 35.2 |
| VOLUME RATIO OF INORGANIC PIGMENT TO INORGANIC SOLID (VOLUME %) |  |  | 12.9 | 70.0 | 90.0 | 27.5 |
| VOLUME RATIO (MULTIPLE) OF INORGANIC PIGMENT TO PHOTOINITIATOR |  |  | 1.1 | 11.7 | 8.6 | 4.2 |
| EVALUATION | INK VISCOSITY |  | GOOD | GOOD | GOOD | UNACCEPTABLE |
|  | FIXING PROPERTY |  | GOOD | GOOD | UNACCEPTABLE | — |
|  | CONCEALABILITY |  | UNACCEPTABLE | GOOD | GOOD | — |
|  | PHOTOCURING PROPERTY |  | GOOD | UNACCEPTABLE | GOOD | — |
|  | TOTAL EVALUATION |  | UNACCEPTABLE | UNACCEPTABLE | UNACCEPTABLE | UNACCEPTABLE |

As shown in Tables 1 and 2, in Examples 1 through 14, evaluation results on ink viscosity, adhesion strength, concealability, and photocuring property are "acceptable" or more. This shows that an ink with these properties improved in a good balance can be prepared by setting the volume ratio of the inorganic solid to the ink total amount at 35 volume % or less, the volume ratio of the inorganic pigment to the inorganic solid at 15 volume % or more and less than 90 volume %, and the volume ratio of the inorganic pigment to the photoinitiator at 11 times or less.

Specific examples of the present disclosure have been described in detail hereinbefore, but are merely illustrative examples, and are not intended to limit the scope of claims. The techniques described in the scope of claims include various modifications and changes of the above exemplified specific examples.

DESCRIPTION OF REFERENCE CHARACTERS

1 inkjet apparatus
10 inkjet head
12 case
13 storage
15 liquid feeding path
16 ejection part
17 ejection orifice
18 piezoelectric device
20 guide shaft
30 UV irradiator
40 printing cartridge
100 stirring mill
110 supply port
120 stirring vessel
132 stirring blade
134 shaft
140 filter
150 ejection port
A liquid feeding direction
X axial direction of guide shaft
Y vertical direction of guide shaft

What is claimed is:

1. An inkjet ink for a glass substrate, the inkjet ink configured for use in drawing an image on a transparent glass substrate, the inkjet ink comprising:
   an inorganic solid including an inorganic pigment and a glass frit, the inorganic pigment configured for use in developing any color except for black;

a monomer component having a photocuring property; and a photoinitiator, wherein:

a volume ratio of the inorganic solid in a case where a total volume of the inkjet ink is 100 volume % is 35 volume % or less, a volume ratio of the inorganic pigment in the case where the total volume of the inorganic solid is 100 volume % is 15 volume % or more and less than 90 volume %, and a volume ratio of the inorganic pigment to the photoinitiator is 11 times or less; and wherein the monomer component includes at least:

a monofunctional acrylate monomer including one acryloyl group or one methacryloyl group in a molecule;

a monofunctional N-vinyl compound monomer in which one vinyl group is bound to a nitrogen (N) atom of a nitrogen-containing compound; and a polyfunctional vinyl ether monomer including at least two vinyl ether groups in a molecule.

2. The inkjet ink according to claim 1, wherein the inorganic pigment is an inorganic pigment that develops a color of cyan, magenta, or yellow.

3. The inkjet ink according to claim 1, wherein the volume ratio of the inorganic solid in the case where the total volume of the inkjet ink is 100 volume % is 15 volume % or more and 30 volume % or less.

4. The inkjet ink according to claim 1, wherein the volume ratio of the inorganic pigment in the case where the total volume of the inorganic solid is 100 volume % is 25 volume % or more and 85 volume % or less.

5. The inkjet ink according to claim 1, wherein the volume ratio of the inorganic pigment to the photoinitiator is 10.7 times or less.

6. The inkjet ink according to claim 1, wherein a volume ratio of the monomer component in the case where the total volume of the inkjet ink is 100 volume % is 50 volume % or more and 75 volume % or less.

7. A method for producing a glass product having a decoration part, the method comprising the steps of:

performing inkjet printing on a surface of a glass substrate with the inkjet ink as recited in claim 1;

applying ultraviolet rays to the surface of the glass substrate and curing the inkjet ink adhering to the surface of the glass substrate; and calcining the glass substrate at a maximum calcination temperature of 450° C. to 1200° C.

8. A method for producing transfer paper for a glass substrate, the transfer paper being for use in the glass substrate to be subjected to calcination, the method comprising the steps of:

performing inkjet printing on a surface of a mount with the inkjet ink as recited in claim 1; and applying ultraviolet rays to the surface of the mount and curing the inkjet ink adhering to the surface of the mount.

* * * * *